(12) United States Patent
Maeda et al.

(10) Patent No.: US 9,645,479 B2
(45) Date of Patent: May 9, 2017

(54) LIGHT EMITTING ELEMENT, LIGHT SOURCE APPARATUS, AND PROJECTOR

(71) Applicant: Sony Corporation, Tokyo (JP)

(72) Inventors: Yuki Maeda, Kanagawa (JP); Takahiro Igarashi, Kanagawa (JP); Yutaka Imai, Tokyo (JP)

(73) Assignee: Sony Corporation, Tokyo (JP)

(*) Notice: Subject to any disclaimer, the term of this patent is extended or adjusted under 35 U.S.C. 154(b) by 73 days.

(21) Appl. No.: 14/665,306

(22) Filed: Mar. 23, 2015

(65) Prior Publication Data

US 2015/0276177 A1    Oct. 1, 2015

(30) Foreign Application Priority Data

Mar. 31, 2014    (JP) .................. 2014-073782

(51) Int. Cl.
  G03B 21/20    (2006.01)
  C09K 11/02    (2006.01)
(52) U.S. Cl.
  CPC ............ G03B 21/204 (2013.01); C09K 11/02 (2013.01)
(58) Field of Classification Search
  CPC ... G03B 21/28; G03B 21/204; Y10S 428/917; F21V 9/10
  See application file for complete search history.

(56) References Cited

U.S. PATENT DOCUMENTS

| 4,855,191 A * | 8/1989 | Arakawa .................. G03C 5/17 250/483.1 |
| 2002/0031688 A1* | 3/2002 | Tanabe ................... H05B 33/20 313/483 |
| 2006/0263627 A1* | 11/2006 | Grampeix .............. C09K 11/08 428/690 |
| 2009/0096360 A1* | 4/2009 | Tanaka ................... C09K 11/06 313/504 |
| 2011/0171447 A1* | 7/2011 | Krishnamoorthy .. C09D 183/04 428/220 |
| 2014/0028984 A1* | 1/2014 | Osaka ................ G03B 21/2013 353/31 |

FOREIGN PATENT DOCUMENTS

JP    2012/185402 A    9/2012

* cited by examiner

*Primary Examiner* — Sultan Chowdhury
(74) *Attorney, Agent, or Firm* — Wolf, Greenfield & Sacks, P.C.

(57) ABSTRACT

A light emitting element includes a base material having a rough surface and a phosphor layer which is directly or indirectly formed on the rough surface of the base material and includes a plurality of phosphor particles which are bonded to each other by a binder.

17 Claims, 7 Drawing Sheets

LIGHT EMITTING ELEMENT, LIGHT SOURCE APPARATUS, AND PROJECTOR

CROSS REFERENCE TO RELATED APPLICATIONS

This application claims the benefit of Japanese Priority Patent Application JP 2014-073782 filed Mar. 31, 2014, the entire contents of which are incorporated herein by reference.

BACKGROUND

The present disclosure relates to a light emitting element which emits fluorescence, a light source apparatus including the light emitting element, and a projector.

In recent years, a projection type image display apparatus which projects a screen of a personal computer, a video footage, or the like on a screen, that is, a projector has been used. As a light source apparatus in the projector, a discharge lamp with high luminance was mainly used before, however, in recent years, a light source apparatus in which a semiconductor light emitting element such as a light emitting diode (LED), a laser diode (LD), or an organic EL is used has been proposed.

As such a light source apparatus, a light source apparatus which extracts white light as fluorescent by irradiating a phosphor with light emitted from a light emitting diode (LED) or a laser has been proposed (for example, refer to Japanese Unexamined Patent Application Publication No. 2012-185402). A light source apparatus in Japanese Unexamined Patent Application Publication No. 2012-185402 includes a light source for excitation light generating excitation light which ejects excitation light (blue light) for exciting a phosphor and a phosphor wheel having a phosphor layer which emits wavelength light different from the excitation light in response to the excitation light. The phosphor wheel is provided with a phosphor layer including a plurality of phosphor particles which are bonded to each other by a binder on a support base material.

SUMMARY

However, when an output of excitation light with which the phosphor is irradiated is enhanced in order to obtain a high output, a calorific value of the phosphor is increased, therefore, the temperature of the phosphor itself becomes high. Therefore, there is a possibility that the phosphor layer is peeled from the support base material due to the generation of a thermal stress accompanied by heat generation of the phosphor.

It is desirable to provide a light emitting element capable of obtaining a high output and having excellent structural stability, a light source apparatus including the light emitting element, and a projector.

According to an embodiment of the present disclosure, there is provided a light emitting element including a base material having a rough surface and a phosphor layer which is directly or indirectly formed on the rough surface of the base material and includes a plurality of phosphor particles which are bonded to each other by a binder.

According to another embodiment of the present disclosure, there is provided a light source apparatus including a light source part and a light emitting element which emits fluorescent by being excited with light emitted from the light source part. Here, the light emitting element includes a base material having a rough surface and a phosphor layer which is directly or indirectly formed on the rough surface of the base material and includes a plurality of phosphor particles which are bonded to each other by a binder.

According to still another embodiment of the present disclosure, there is provided a projector including a light source apparatus including a light emitting element, a light modulation element modulating light which is ejected from the light source apparatus, and a projection optical system projecting light from the light modulation element. Here, the light emitting element includes a base material having a rough surface and a phosphor layer which is formed on the rough surface of the base material and includes a plurality of phosphor particles which are bonded to each other by a binder.

In the light emitting element, the light source apparatus, and the projector of the embodiments of the present disclosure, since the phosphor layer includes a plurality of phosphor particles which are bonded to each other by the binder and is formed on the rough surface of the base material, the phosphor layer has excellent adhesion to the base material and the phosphor layer is hardly peeled.

According to the light emitting element, the light source apparatus, and the projector of the embodiments of the present disclosure, the phosphor layer is hardly peeled from the base material. Therefore, it is possible to obtain fluorescent having higher energy by irradiating with respect to the phosphor layer with the excitation light having higher energy while ensuring structural stability thereof.

According to the light source apparatus of the embodiment of the present disclosure, since the light source apparatus includes the light emitting element described above, the emission of light having higher luminance can be obtained. In addition, according to the projector of the embodiment of the present disclosure, since the projector includes the light emitting element described above, it is possible to exhibit excellent display performance.

Here, the effect of the present disclosure is not limited thereto and may be any of the effects in the following description.

DETAILED DESCRIPTION OF EMBODIMENTS

Hereinafter, the embodiments of the present disclosure will be described with reference to the drawings in details. Here, description will be given in the following order.
1. Basic configuration (reflection type light emitting element)
2. Modification example (transmission type light emitting element)
3. Application example (light source apparatus and projector)
4. Experimental example 1. Reflection Type Light Emitting Element
Configuration of Light Emitting Element 1

Figure 1A:
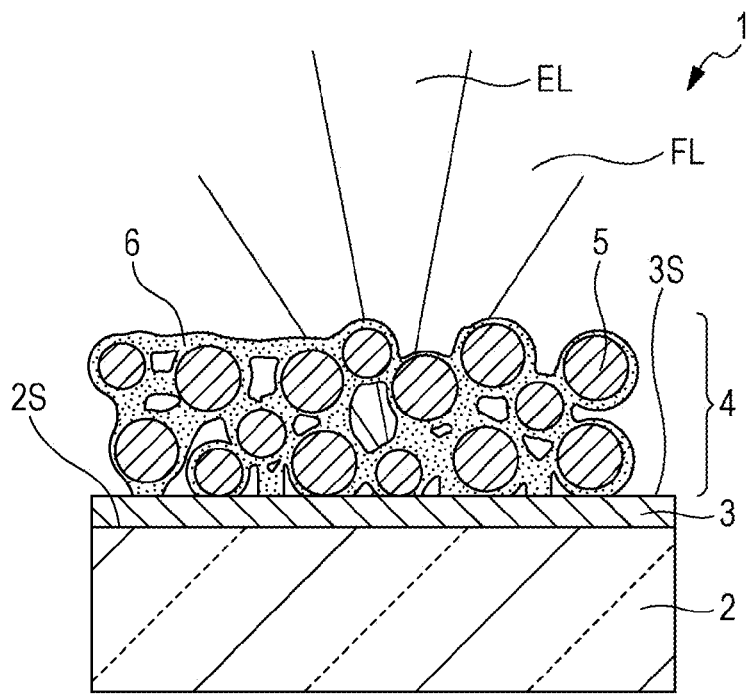
FIG. 1A is a cross-sectional view illustrating a light emitting element according to an embodiment of the present disclosure.
Figure 1B:
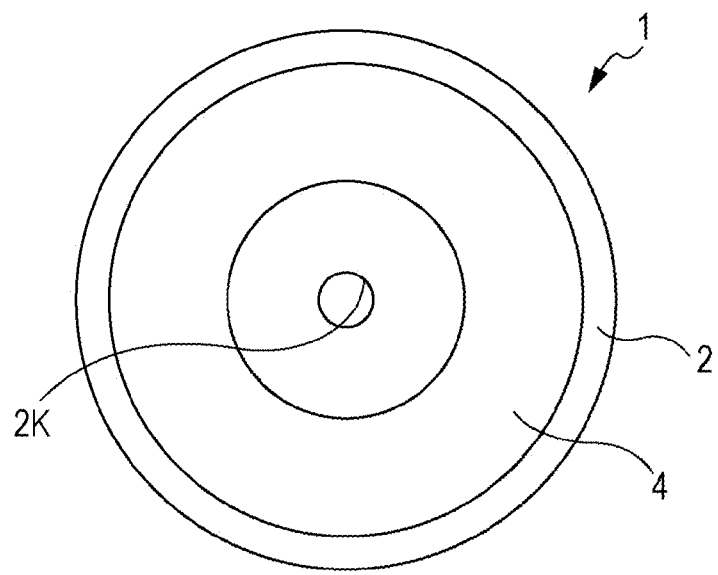
FIG. 1B is a plane view illustrating a light emitting element shown in FIG. 1A.

FIG. 1A illustrates a cross-sectional configuration of a light emitting element 1 according to an embodiment of the present disclosure. In addition, FIG. 1B illustrates a plane configuration of a light emitting element 1. The light emitting element 1 is also called as a phosphor wheel and is a light emitting element in which a reflective layer 3 and a phosphor layer 4 are laminated in order on a surface 2S of a base material 2 including a thin plate having a circular planar shape. Meanwhile, an opening 2K is provided at the center of the base material 2.

The base material 2 functions as a substrate which supports the reflective layer 3 and the phosphor layer 4 and also functions as a heat radiation member. The base material 2 consists of an inorganic material such as a metal material or a ceramic material. As a constituent material of the base material 2, a material having high thermal conductivity and excellent in affinity with the reflective layer 3 or the phosphor layer 4 is preferable. It is particularly desirable that the difference between the linear expansion coefficient of the base material 2 and the linear expansion coefficient of the binder 6 (described later) in the phosphor layer 4 is 7.6 ppm/K or less. Specifically, as a metal material configuring the base material 2, for example, a single metal of Mo (molybdenum), W (tungsten), Co (cobalt), Cr (chromium), Pt (platinum), Ta (tantalum), Li (lithium), Zr (zirconium), Ru (ruthenium), Rh (rhodium), or Pd (palladium), and an alloy including one or more kinds thereof are included. Alternatively, an alloy such as CuW in which the content rate of W (tungsten) is 80 atomic % or more or CuMo in which the content rate of Mo (molybdenum) is 40 atomic % or more can also be used as a metal material configuring the base material 2. In addition, as a ceramic material, for example, a material including SiC (silicon carbide), AlN (aluminum nitride), BeO (beryllium oxide), a composite material of Si and Sic, or a composite material of SiC and Al (however, a material in which the content rate of SiC is 50% or more) is included. Furthermore, a quartz can also be used, in addition to a crystal material such as a single Si or SiC, a diamond, or a sapphire. Among those, the base material 2 is preferably a single of Mo, Si (silicon), and W (tungsten) as a constituent element. This is because that such a material has high thermal conductivity and the linear expansion coefficient of the base material 2 including such a material is relatively close to the linear expansion coefficient of the binder 6 in the phosphor layer 4.

The surface 2S of the base material 2 is a rough surface which is roughened and, for example, it is desirable to have a surface roughness Ra value from 10 nm to 300 nm.

The reflective layer 3 is formed on the surface 2S which is roughened. The thickness of the reflective layer 3 is, for example, from 100 nm to 2,000 nm. Therefore, a surface 12S of the reflective layer 3 is also a rough surface. The reflective layer 3 is formed by a metal film or the like including a metallic element such as Al (aluminum), Ag (silver) or Ti (titanium), in addition to, for example, a dielectric multilayer film. The reflective layer 3 reflects the excitation light EL (for example, laser light) irradiated from the outside or the fluorescent FL from the phosphor layer 4 and functions so as to enhance the luminous efficiency in the light emitting element 1.

The phosphor layer 4 is formed on the surface 2S which is roughened through the reflective layer 3. The phosphor layer 4 includes a plurality of phosphor particles 5 which are bonded to each other by the binder 6. The binder 6 bonds one phosphor particle 5 to the other phosphor particle 5 adjacent to each other and also bonds the phosphor particle 5 to the surface 12S of the reflective layer 3. The binder 6 includes a crosslinked body of an inorganic material such as, for example, a water glass. The water glass is a silicic acid compound which is also called as sodium silicate, potassium silicate, or silicate soda and is a liquid in which $SiO_2$ (anhydrous silicate) and $Na_2O$ (soda oxide) or $K_2O$ (potassium oxide) are mixed with a predetermined ratio. The molecular formula is represented by $Na_2O.nSiO_2$. The phosphor particle 5 is a particulate phosphor which absorbs the excitation light EL irradiated from the outside (for example, laser light) to emit the fluorescent FL. For example, the fluorescent substance which is excited by blue laser light having a wavelength in a blue wavelength range (for example, from 400 nm to 470 nm) to emit yellow fluorescent (light in a wavelength range between a red wavelength range and a green wavelength range) is included in the phosphor particle 5. As such a fluorescent substance, for example, YAG (yttrium, aluminum, and garnet) based material is used.

The thickness of the phosphor layer 4 is preferably, for example, 200 μm or less. This is because that the light conversion efficiency of 80% or more is obtained when the surface roughness Ra value is approximately 10 nm. As to the thickness of the phosphor layer 4, it is particularly preferable to have a thickness from 30 μm to 120 μm. This is because that the light conversion efficiency of 80% or more is obtained when the surface roughness Ra value is in a range from 10 nm to 300 nm. The light conversion efficiency mentioned here means a ratio of an energy of the fluorescent FL emitted from the phosphor layer 4 by irradiation with the excitation light EL to an energy of the excitation light EL with which the light emitting element 1 is irradiated.

Action Effect of Light Emitting Element 1

The light emitting element 1 is a so-called reflection type light emitting element. In the light emitting element 1, for example, when the phosphor layer 4 is irradiated with the excitation light EL such as laser light, each phosphor particle 5 is excited and the fluorescent FL having a wavelength different from the excitation light EL is emitted from each phosphor particle 5. That is, the excitation light EL is converted into the fluorescent FL having a wavelength different from the irradiated excitation light EL owing to the phosphor layer 4. In doing so, the reflective layer 3 reflects the excitation light EL irradiated from the outside or the fluorescent FL from the phosphor layer 4 to enhance the luminous efficiency in the light emitting element 1.

In the light emitting element 1, since the phosphor layer 4 includes a plurality of phosphor particles 5 which are bonded to each other by the binder 6 using the water glass as a raw material, it is possible to obtain the fluorescent FL having higher luminance. In addition, since the phosphor layer 4 is designed so as to be formed on the rough surface 11S of the base material 2 through the reflective layer 3 which is a thin film, peeling hardly occurs between the base material 2 and the reflective layer 3 or between the reflective layer 3 and the phosphor layer 4. Therefore, it is possible to suppress the phosphor layer 4 falling out from the base material 2 and high structural stability can be obtained.

In the light emitting element 1, when the difference between the linear expansion coefficient of the base material 2 and the linear expansion coefficient of the binder 6 is set to 7.6 ppm/K or less, it is possible to surely prevent peeling between the base material 2 and the reflective layer 3 or peeling between the reflective layer 3 and the phosphor layer 4. This is because that the stress inside the phosphor layer 4, accompanied by heat generation, is sufficiently eased even though the phosphor layer 4 generates heat by irradiation with the excitation light EL. In addition, when the phosphor particle 5 is excessively raised in its temperature, the conversion efficiency from the excitation light EL into the fluorescent FL deteriorates, therefore, the brightness is decreased. For example, in a case where the phosphor particle 5 consists of YAG, when the high temperature of approximately 200° C. or higher is obtained, there is a possibility that the light conversion efficiency considerably deteriorates. Therefore, the heating of the phosphor particle 5 is suppressed (for example, keeping 190° C. or lower) by using a material having high heat dissipation (material having high thermal conductivity) as a constituent material of the base material 2, therefore, it is possible to further enhance the light conversion efficiency of the phosphor layer 4.

2. Modification Example

Transmission Type Light Emitting Element

Configuration of Light Emitting Element 1A

Figure 2:
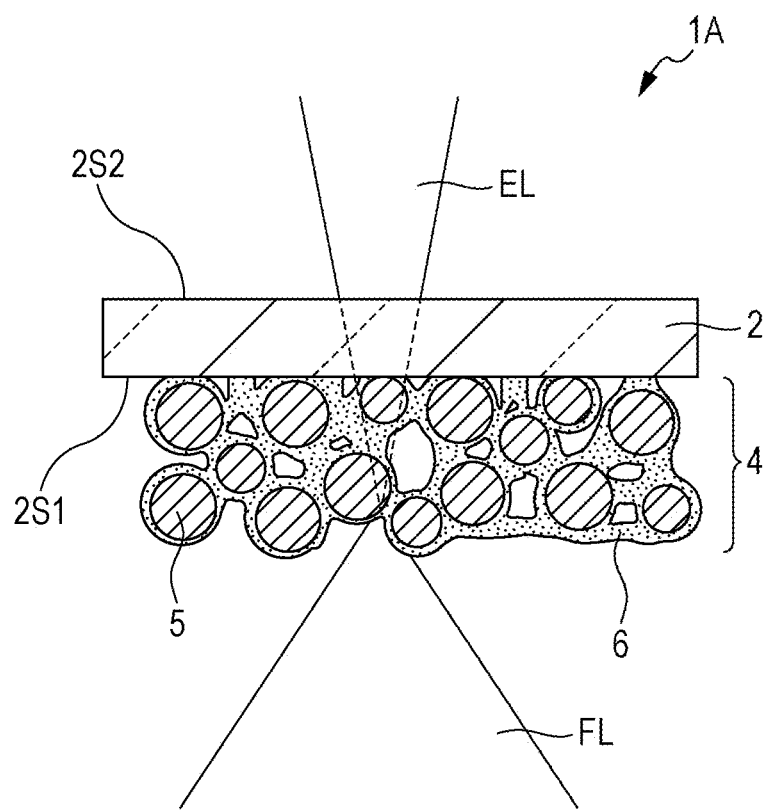
FIG. 2 is a cross-sectional view illustrating a configuration example of a light emitting element as a modification example.

FIG. 2 illustrates a cross-sectional configuration of a light emitting element 1A as a modification example of the embodiment and corresponds to FIG. 1A and FIG. 1B. The light emitting element 1A is a light emitting element in which the phosphor layer 4 is formed on a surface 2S1 of the base material 2. The surface 2S1 is a rough surface and, for example, it is desirable to have a surface roughness Ra value from 10 nm to 300 nm.

The light emitting element 1A is different from the light emitting element 1 of the embodiment described above and is a so-called transmission type light emitting element. In addition, the base material 2 is configured of a transparent material and has a property of transmitting the excitation light EL with which a rear face 2S2 is irradiated on the side opposite to the surface 2S1. As a constituent material of the base material 2, specifically, for example, a quartz, a glass, a sapphire, a crystal, or YAG is included. In addition, a dichroic mirror transmitting the excitation light EL and reflecting the fluorescent FL may be provided on the surface 2S1 to enhance the luminous efficiency of the light emitting element 1A. The other configuration of the light emitting element 1A is the same as that of the light emitting element 1, except for these points.

Action Effect of Light Emitting Element 1A

In the light emitting element 1A, when the excitation light EL such as, for example, laser light is transmitted through the base material 2 to irradiate to the phosphor layer 4, each phosphor particle 5 is excited and the fluorescent FL having a wavelength different from the excitation light EL is emitted from each phosphor particle 5. In such a light emitting element 1A, the same effect as that of the light emitting element 1 of the embodiment described above is also obtained.

3. Application Example

Light Source Apparatus and Projector

Configuration of Light Source Apparatus and Projector

Figure 3:
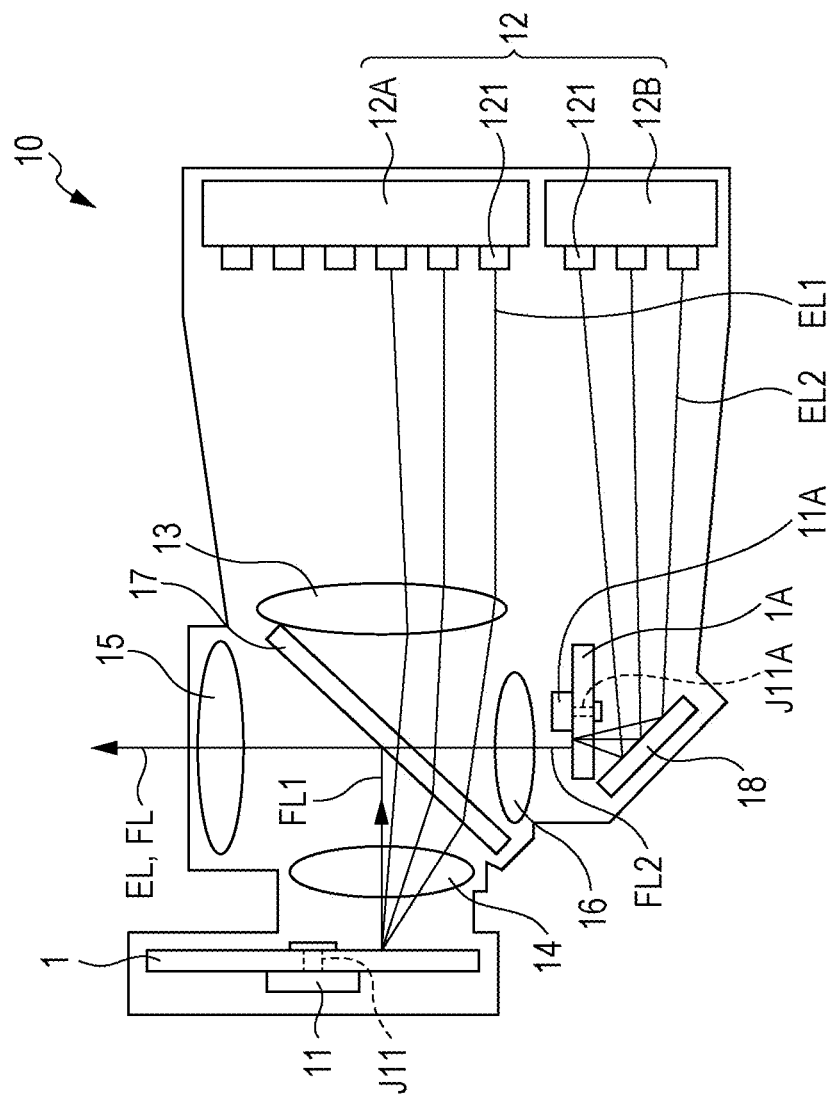
FIG. 3 is a schematic view illustrating a configuration example of a light source apparatus having a light emitting element of the present disclosure.
Figure 4:
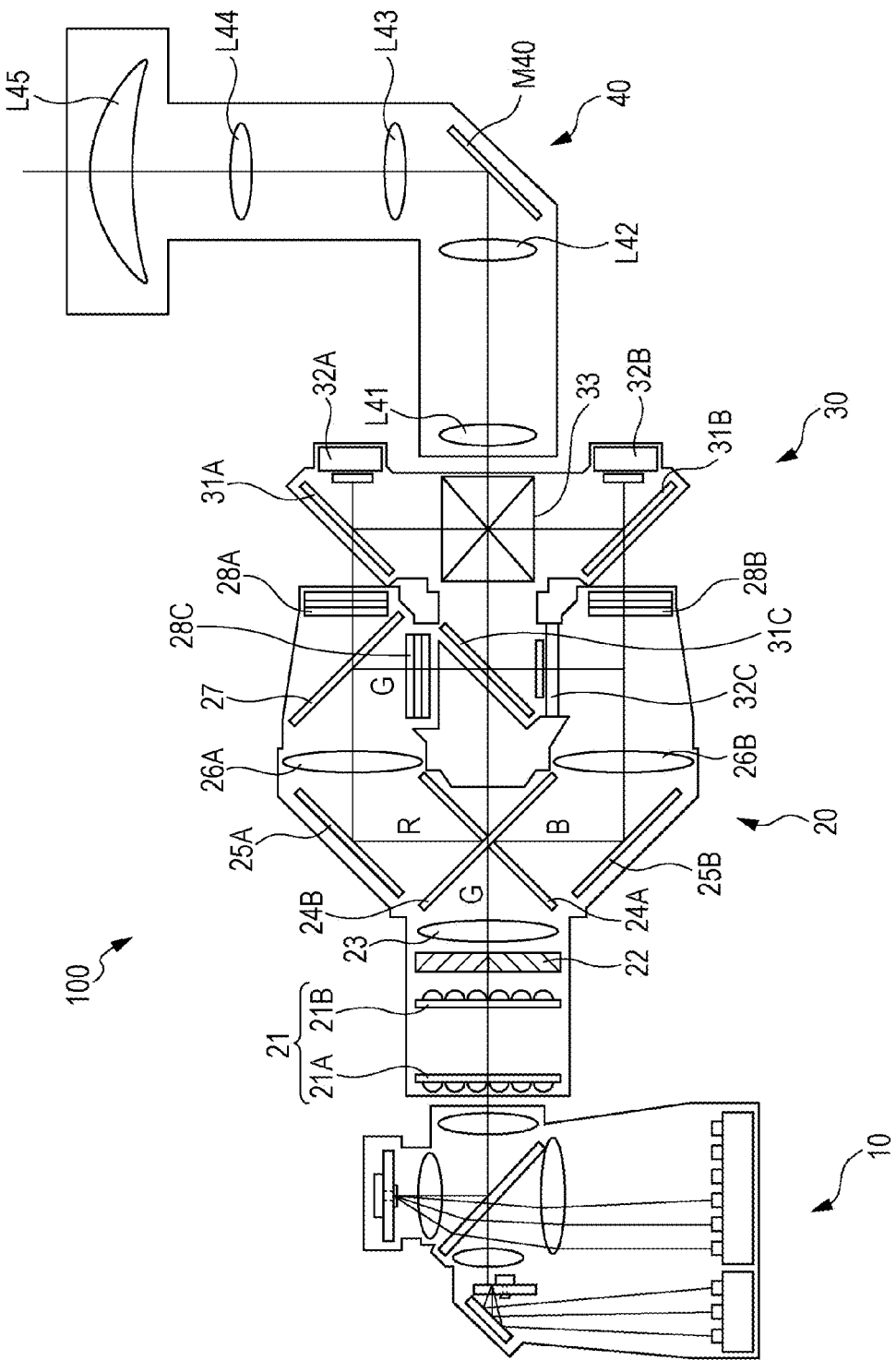
FIG. 4 is a schematic view illustrating a configuration example of a projector including a light source apparatus having a light emitting element of the present disclosure.

Next, a light source apparatus 10 having the light emitting elements 1 and 1A and a projector 100 including the light source apparatus 10 will be described with reference to FIG. 3 and FIG. 4. FIG. 3 is a schematic view illustrating an entire configuration of a light source apparatus 10 and FIG. 4 is a schematic view illustrating an entire configuration of the projector 100 including the light source apparatus 10. Meanwhile, hereinafter, description will be given by exemplifying a reflection type 3LCD system projector that performs the optical modulation by using a reflection type liquid crystal panel (LCD). However, the light emitting elements 1 and 1A can also be applied to a projector using a transmission type liquid crystal panel, a digital micro-mirror device (DMD), or the like, instead of a reflection type liquid crystal panel.

The light source apparatus 10 includes the light emitting elements 1 and 1A, a motor 11 including a rotation axis J11, a motor 11A including a rotation axis J11A, a light source part 12 emitting the excitation light EL, lenses 13 to 16, a dichroic mirror 17, and a reflection mirror 18. The light emitting element 1 is rotatably supported by the rotation axis J11 and the light emitting element 1A is rotatably supported by the rotation axis J11A. The light source part 12 includes a first laser group 12A and a second laser group 12B. Both of the first and the second laser groups 12A and 12B are groups in which a plurality of semiconductor laser elements 121 which oscillates blue laser light as excitation light are arrayed. Here, for convenience, the excitation light oscillated from the first laser group 12A is referred to as EL1 and the excitation light oscillated from the second laser group 12B is referred to as EL2.

The light emitting element 1 is arranged so that the excitation light EL1 transmitted through the lens 13, the dichroic mirror 17, and the lens 14 in order from the first laser group 12A enters the phosphor layer 4 (not shown in FIG. 3 and FIG. 4). The fluorescent FL1 from the light emitting element 1 is reflected by the dichroic mirror 17 and afterward is transmitted through the lens 15 and goes toward the outside, that is, an illumination optical system 20 (described later). On the other hand, the light emitting element 1A is arranged so that the excitation light EL2 passing through the reflection mirror 18 from the second laser group 12B is transmitted through the base material 2 to enter the phosphor layer 4 (not shown in FIG. 3 and FIG. 4). The fluorescent FL2 from the light emitting element 1A is transmitted through the dichroic mirror 17 and afterward is transmitted through the lens 15 and goes toward the outside, that is, the illumination optical system 20 (described later). Meanwhile, in the operation of the light source apparatus 10, the light emitting elements 1 and 1A are respectively rotated around the rotation axes J11 and J11A as the center of the rotation. The diameter of the light emitting elements 1 and 1A is, for example, from approximately 50 mm to 70 mm and the light emitting elements 1 and 1A are rotated at a rotation speed from, for example, 4,800 rpm to 10,800 rpm by the motors 11 and 11A. In this way, the reason for rotating the light emitting elements 1 and 1A is to maintain structural stability and to prevent a decrease in conversion efficiency by suppressing local temperature rise accompanied with irradiation with the excitation lights EL1 and EL2. In addition, in order to cool heating of the phosphor layer 4 accompanied with irradiation with the excitation lights EL1 and EL2, it is desirable to provide a cooling fan.

As shown in FIG. 4, the projector 100 includes the light source apparatus 10, the illumination optical system 20, an image forming part 30, and a projection optical system 40 in order.

The illumination optical system 20 includes, for example, a fly eye lens 21 (21A and 21B), a polarization conversion element 22, a lens 23, dichroic mirrors 24A and 24B, reflection mirrors 25A and 25B, lenses 26A and 26B, a dichroic mirror 27, and polarization plates 28A to 28C from the position close to the light source apparatus 10.

The fly eye lens 21 (21A and 21B) realizes the homogenization of the illuminance distribution of white light from the lens 15 in the light source apparatus 10. The polarization conversion element 22 functions so as to align the polarization axis of incident light in a predetermined direction. For example, light except P polarization is converted into P polarization. The lens 23 condenses light from the polarization conversion element 22 toward the dichroic mirrors 24A and 24B. The dichroic mirrors 24A and 24B selectively reflect light in a predetermined wavelength range and selectively transmit light in the other wavelength range. For example, the dichroic mirror 24A mainly reflects red light in a direction of the reflection mirror 25A. In addition, the dichroic mirror 24B mainly reflects blue light in a direction of the reflection mirror 25B. Therefore, green light is mainly transmitted through both dichroic mirrors 24A and 24B and goes toward a reflection type polarization plate 31C (described later) of the image forming part 30. The reflection mirror 25A reflects light (mainly red light) from the dichroic mirror 24A toward the lens 26A and the reflection mirror 25B reflects light (mainly blue light) from the dichroic mirror 24B toward the lens 26B. The lens 26A transmits light (mainly red light) from the reflection mirror 25A to condense toward the dichroic mirror 27. The lens 26B transmits light (mainly blue light) from the reflection mirror 25B to condense toward the dichroic mirror 27. The dichroic mirror 27 selectively reflects green light and also selectively transmits light in the other wavelength range. Here, a red light component among light from the lens 26A is transmitted. In a case of including a green light component in light from the lens 26A, the green light component is reflected toward the polarization plate 28C. The polarization plates 28A to 28C include a polarizer having a polarization axis of a predetermined direction. For example, in a case of being converted into P polarization in the polarization conversion element 22, the polarization plates 28A to 28C transmit light of P polarization and reflect light of S polarization.

The image forming part 30 includes reflection type polarization plates 31A to 31C, reflection type liquid crystal panels 32A to 32C, and a dichroic prism 33.

The reflection type polarization plates 31A to 31C respectively transmit light having the same polarization axis (for example, P polarization) as the polarization axis of polarized light from the polarization plates 28A to 28C and reflect light having the other polarization axis (for example, S polarization). Specifically, the reflection type polarization plate 31A transmits red light of P polarization from the polarization plate 28A in a direction of the reflection type liquid crystal panel 32A. The reflection type polarization plate 31B transmits blue light of P polarization from the polarization plate 28B in a direction of the reflection type liquid crystal panel 32B. The reflection type polarization plate 31C transmits green light of P polarization from the polarization plate 28C in a direction of the reflection type liquid crystal panel 32C. In addition, green light of P polarization which is transmitted through both dichroic mirrors 24A and 24B and enters the reflection type polarization plate 31C is transmitted through the reflection type polarization plate 31C as it is and enters the dichroic prism 33. Furthermore, the reflection type polarization plate 31A reflects red light of S polarization from the reflection type liquid crystal panel 32A to enter the dichroic prism 33. The reflection type polarization plate 31B reflects blue light of S polarization from the reflection type liquid crystal panel 32B to enter the dichroic prism 33. The reflection type polarization plate 31C reflects green light of S polarization from the reflection type liquid crystal panel 32C to enter the dichroic prism 33.

The reflection type liquid crystal panels 32A to 32C respectively carry out spatial modulation of red light, blue light, or green light.

The dichroic prism 33 synthesizes incident red light, blue light and green light to eject toward the projection optical system 40.

The projection optical system 40 includes lenses L41 to L45 and a mirror M40. The projection optical system 40 enlarges emission light emitted from the image forming part 30 to project to a screen (not shown) or the like.

Operation of Light Source Apparatus and Projector

Accordingly, the operation of the projector 100 will be described, including the light source apparatus 10, with reference to FIG. 3 and FIG. 4.

Firstly, in the light source apparatus 10, the motors 11 and 11A are driven and the light emitting elements 1 and 1A are rotated. Afterward, the excitation lights EL1 and EL2 which are blue lights are respectively oscillated from the first and the second laser groups 12A and 12B in the light source part 12.

After being oscillated from the first laser group 12A and being transmitted through the lens 13, the dichroic mirror 17, and the lens 14 in order, the excitation light EL1 is irradiated to the phosphor layer 4 of the light emitting element 1. The phosphor layer 4 of the light emitting element 1 absorbs a part of the excitation light EL1 to convert into the fluorescent FL1 which is yellow light and emits the fluorescent FL1 toward the lens 14. After being reflected by the dichroic mirror 17, the fluorescent FL1 is transmitted through the lens 15 to go toward the illumination optical system 20. At this time, the reflective layer 3 of the light emitting element 1 reflects the remaining excitation light EL1 which is not absorbed by the phosphor layer 4 toward the lens 14. The excitation light EL1 reflected by the reflective layer 3 of the light emitting element 1 is also reflected by the dichroic mirror 17 and afterward is transmitted through the lens 15 to go toward the illumination optical system 20.

After being oscillated from the second laser group 12B and passing through the reflection mirror 18, the excitation light EL2 is irradiated to the phosphor layer 4 of the light emitting element 1A. The phosphor layer 4 of the light emitting element 1A absorbs a part of the excitation light EL2 to convert into the fluorescent FL2 which is yellow light and emits the fluorescent FL2 toward the lens 16. After being transmitted through the dichroic mirror 17, the fluorescent FL2 is transmitted through the lens 15 to go toward the illumination optical system 20. At this time, the light emitting element 1A transmits the remaining excitation light EL2 which is not absorbed by the phosphor layer 4 toward the lens 16. The excitation light EL2 transmitted through the light emitting element 1A is also transmitted through the dichroic mirror 17 and the lens 15 in series to go toward the illumination optical system 20.

In doing so, the light source apparatus 10 synthesizes the fluorescent FL (FL1 and FL2) which is yellow light and the excitation light EL (EL1 and EL2) which is blue light to make white light enter the illumination optical system 20.

White light emitted from the light source apparatus 10 is transmitted through the fly eye lens 21 (21A and 21B), the polarization conversion element 22, and the lens 23 in series and afterward reaches the dichroic mirrors 24A and 24B.

Red light is mainly reflected by the dichroic mirror 24A and the red light is transmitted through the reflection mirror 25A, the lens 26A, the dichroic mirror 27, the polarization plate 28A, and the reflection type polarization plate 31A in series to reach the reflection type liquid crystal panel 32A. Furthermore, after being spatially modulated by the reflection type liquid crystal panel 32A, the red light is reflected by the reflection type polarization plate 31A to enter the dichroic prism 33. Meanwhile, in a case of including a green light component in light reflected by the dichroic mirror 24A toward the reflection mirror 25A, the green light component is reflected by the dichroic mirror 27, is transmitted through the polarization plate 28C and the reflection type polarization plate 31C in series, and reaches the reflection type liquid crystal panel 32C. Blue light is mainly reflected by the dichroic mirror 24B and enters the dichroic prism 33 through the same process. Green light transmitted through the dichroic mirrors 24A and 24B also enters the dichroic prism 33.

After being synthesized, red light, blue light, and green light which enter the dichroic prism 33 are ejected as video light toward the projection optical system 40. The projection optical system 40 enlarges video light from the image forming part 30 to project to a screen (not shown) or the like.

In this way, according to the light source apparatus 10 of the present disclosure, since the light source apparatus 10 includes the light emitting elements 1 and 1A described above, the emission of light having higher luminance can be obtained. In addition, according to the projector 100 of the present disclosure, since the projector includes the light source apparatus 10 including the light emitting elements 1 and 1A described above, it is possible to exhibit excellent display performance.

EXPERIMENTAL EXAMPLE

Experimental Examples 1-1 to 1-8

According to a sample substrate forming a film including only binder 6 composed of the crosslinked body of the water glass on the base material 2 made of a predetermined material, when the temperature change (d260° C.) in a range from −60° C. to +200° C. is added, the presence or absence of the destruction of the film was examined. The results are shown in Table 1. Here, the presence or absence of the destruction of the film was confirmed and the difference in linear expansion coefficient IEs-IEb (ppm/K) which is the difference between the linear expansion coefficient IEs of the base material 2 and the linear expansion coefficient IEb of the film including the binder was also measured. Meanwhile, the surface roughness Ra value in the surface 2S of the base material 2 was set to 3 nm.

TABLE 1

| | Base material | Difference in linear expansion coefficient [ppm/K] | Presence or absence of destruction of film |
|---|---|---|---|
| Experimental example 1-1 | Si | −2.0 | Absence |
| Experimental example 1-2 | Mo | 0.1 | Absence |
| Experimental example 1-3 | W89Cu11 | 1.5 | Absence |
| Experimental example 1-4 | Cu40Mo60 | 5.7 | Absence |
| Experimental example 1-5 | Al50SiC50 | 6.6 | Absence |
| Experimental example 1-6 | Co | 7.6 | Absence |
| Experimental example 1-7 | Al60SiC40 | 8.3 | Presence |
| Experimental example 1-8 | Al70SiC30 | 9.0 | Presence |

As shown in Table 1, it was confirmed that the destruction of the film including the binder did not occur when the difference in linear expansion coefficient IEs-IEb was 7.6 ppm/K or less.

Experimental Example 2

Next, the relationship between the difference in the linear expansion coefficient IEs-IEb and the thermal conductivity in the material using in the base material was examined. The results are shown in FIG. 5.

Figure 5:
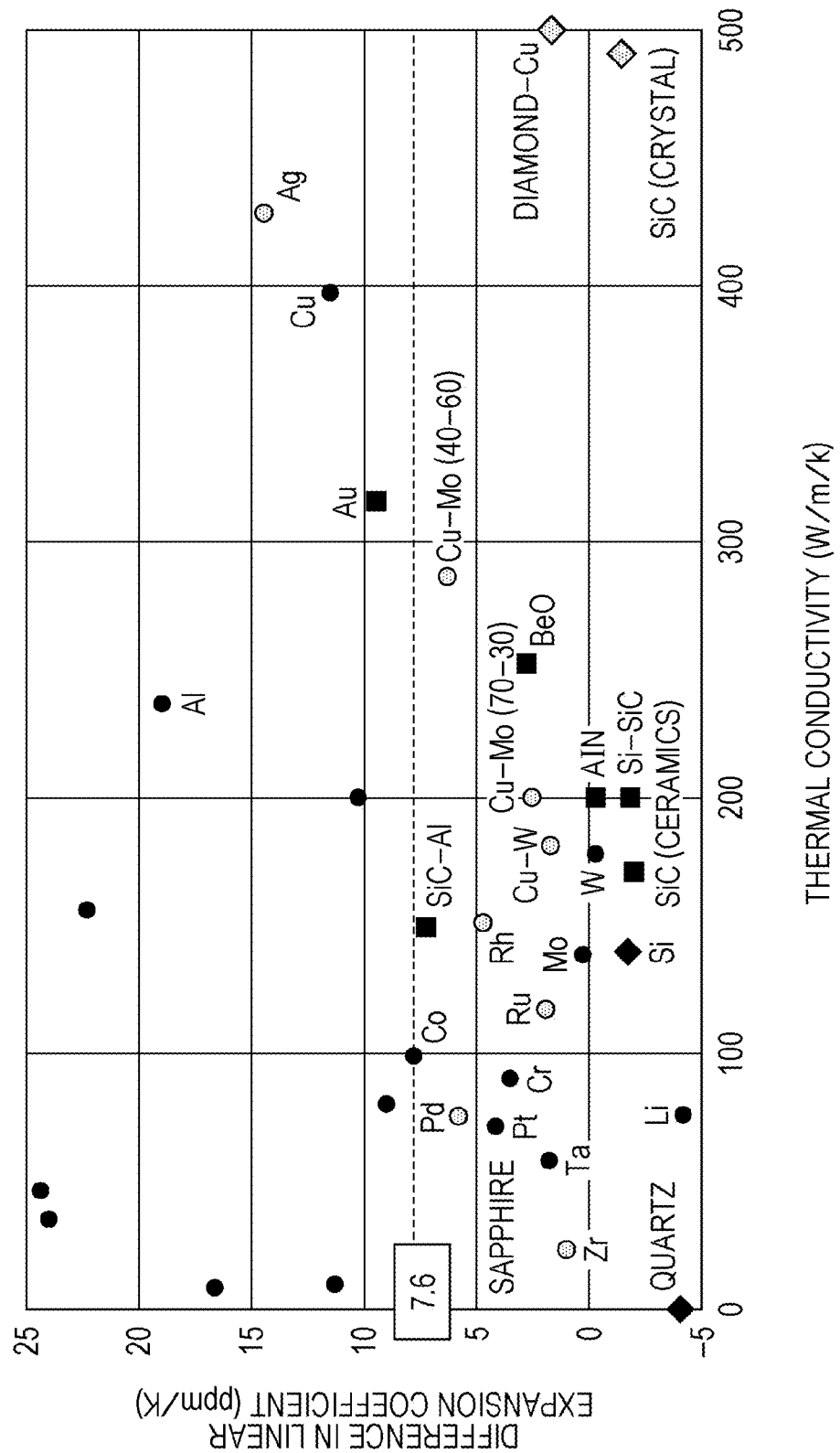
FIG. 5 is a characteristics chart illustrating the relationship between the linear expansion coefficient and the thermal conductivity of a material used in a base material in an experimental example 2.

As shown in FIG. 5, in a case of using a single metal of Mo, W, Co, Cr, Pt, Ta, Li, Zr, Ru, Rh, or Pd, CuW in which the content rate of W is 80 atomic % or more, CuMo in which the content rate of No is 40 atomic % or more, SiC (ceramics), AlN, BeO, a composite material of Si and SiC (Si—SiC), a composite material of SiC and Al (SiC—Al), Si, SiC (crystal), a diamond, a sapphire, or a quartz as a material of the base material 2, the difference in linear expansion coefficient IEs-IEb became 7.6 ppm/K or less and it was confirmed that they were suitable as a material of the base material 2. Among those, as to Mo, Si, and W, it was found that the difference in linear expansion coefficient IEs-IEb was small and Mo, Si, and W had high thermal conductivity.

Experimental Example 3

Figure 6A:
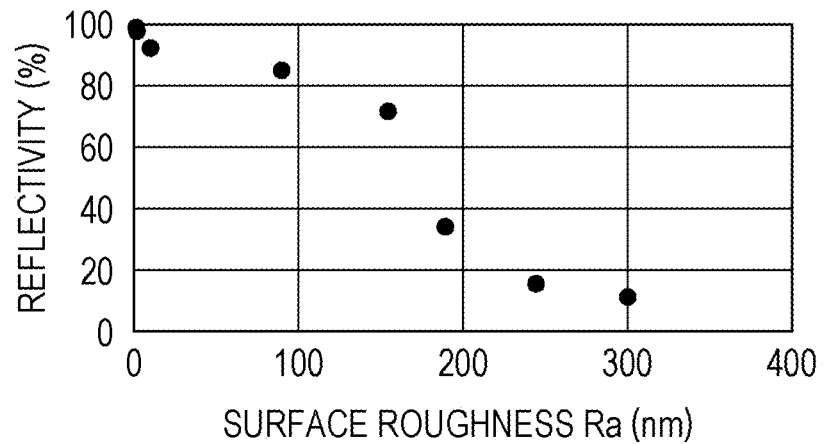
FIG. 6A is a characteristics chart illustrating the relationship between the surface roughness of the surface of a base material and the reflectivity of a reflective layer in an experimental example 3.

Next, according to the light emitting element 1, the relationship between the surface roughness Ra value (nm) of the surface 2S of the base material 2 and the reflectivity (%) of the reflective layer 3 and the relationship between the surface roughness Ra value (nm) of the surface 2S of the base material 2 and the light conversion efficiency (%) were examined. The results are respectively shown in FIG. 6A and FIG. 6B. In FIG. 6A, a horizontal axis expresses the surface roughness Ra value (nm) of the surface 2S and a vertical axis expresses the reflectivity (%) of the reflective layer 3. However, the reflectivity (%) of the reflective layer 3 expresses a numerical value standardized by setting a case where the surface 2S is mirror finished to 100%. On the other hand, in FIG. 6B, a horizontal axis expresses the surface roughness Ra value (nm) of the surface 2S and a vertical axis expresses the light conversion efficiency (%) of the light emitting element 1. However, the light conversion efficiency (%) of the light emitting element 1 expresses a numerical value standardized by setting a case where the surface 2S is mirror finished to 100%. Here, the light conversion efficiency of the light emitting element 1 means a rate of the luminance of fluorescent emitted from the light emitting element 1 to the luminance of the excitation light with which the light emitting element 1 is irradiated.

Figure 6B:
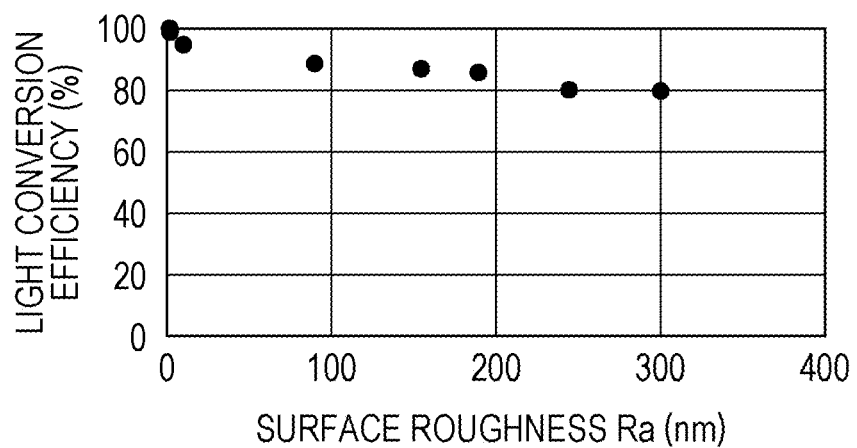
FIG. 6B is a characteristics chart illustrating the relationship between the surface roughness of the surface of a base material and the light conversion efficiency in an experimental example 3.

As shown in FIG. 6A, it was found that the reflectivity (%) of the reflective layer 3 was the highest in a case where the surface 2S was mirror finished (in a case where the Ra value is less than 10 nm), tended to deteriorate as the surface roughness Ra value (nm) of the surface 2S became greater, and deteriorated to 10% at 300 nm of the surface roughness Ra value. On the other hand, it was confirmed that the light conversion efficiency of the light emitting element 1 was the highest in a case where the surface 2S was mirror finished and tended to deteriorate as the surface roughness Ra value of the surface 2S became greater, however, the tendency thereof was moderate, compared to the change in the reflectivity (%) of the reflective layer 3, as shown in FIG. 6B. It was found that it was possible to obtain the light conversion efficiency of 80% or more when the surface roughness Ra value was at least 300 nm or less.

Experimental Example 4

Figure 7:
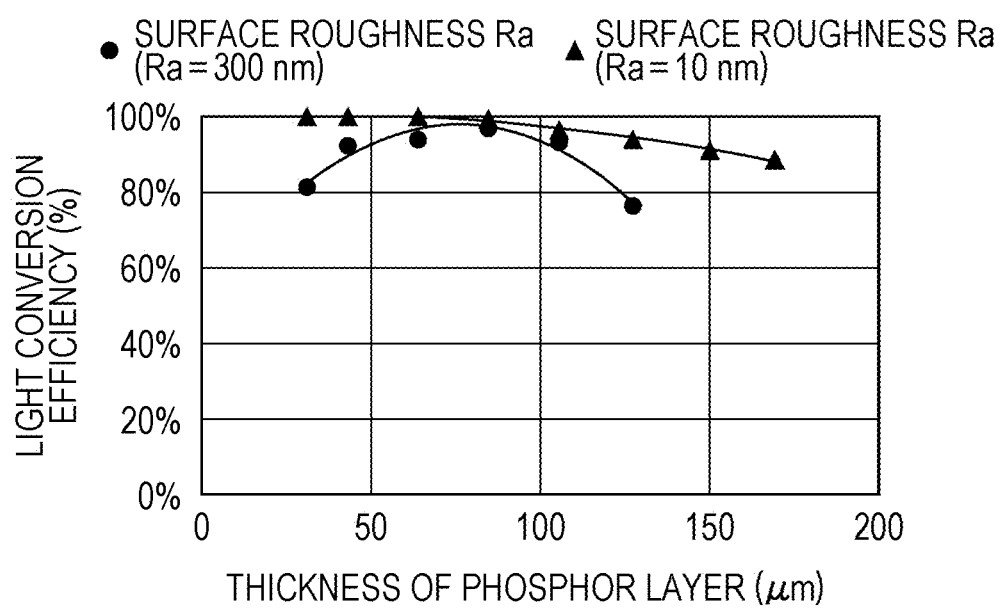
FIG. 7 is a characteristics chart illustrating the relationship between the surface roughness of the surface of a base material, the light conversion efficiency, and the thickness of a phosphor layer in an experimental example 4.

Next, according to the light emitting element 1, the relationship between the surface roughness Ra value (nm) of the surface 2S of the base material 2, the light conversion efficiency (%), and the thickness (μm) of the phosphor layer 4 was examined. The results are shown in FIG. 7. In FIG. 7, a horizontal axis expresses the thickness (μm) of the phosphor layer and a vertical axis expresses the light conversion efficiency (%) of the light emitting element 1. However, the light conversion efficiency (%) of the light emitting element 1 expresses a numerical value standardized by setting a case where the surface 2S is mirror finished to 100%. Here, a case where the surface roughness Ra value was 10 nm (Experimental example 4-1) and a case where the surface roughness Ra value was 300 nm (Experimental example 4-2) were examined.

As shown in FIG. 7, it was confirmed that in a case where the surface roughness Ra value was 10 nm (Experimental example 4-1), it was possible to obtain the light conversion efficiency of 80% or more when the thickness of the phosphor layer was 200 μm or less. On the other hand, it was confirmed that in a case where the surface roughness Ra value was 300 nm (Experimental example 4-2), it was possible to obtain the light conversion efficiency of 80% or more when the thickness of the phosphor layer was from 30 μm to 120 μm.

Hereinbefore, while the present disclosure has been described by giving the embodiments, the present disclosure is not limited to the embodiments, and various modifications are possible. For example, the material, the thickness, and the like of each layer described in the embodiments are one example, are not limited thereto, and may be the other material and thickness.

In addition, in the embodiments, while a case where the surface 2S of the base material 2 is a rough surface which is roughened has been described, the present technology is not limited thereto. For example, the surface 2S of the base material 2 may have the surface roughness Ra value which is less than 10 nm (for example, 5 nm or less). Even in this case, when the difference between the linear expansion coefficient of the base material 2 and the linear expansion coefficient of the binder 6 is set to 7.6 ppm/K or less, it is possible to prevent peeling between the base material 2 and the reflective layer 3 or peeling between the reflective layer 3 and the phosphor layer 4.

In addition, in the embodiments, in the light source apparatus 10, while yellow fluorescent is extracted from the light emitting elements 1 and 1A by being irradiated with blue laser as excitation light EL and is synthesized with blue light to obtain white light, the present technology is not limited thereto.

Furthermore, for example, in the embodiments, while description has been given by specifically giving the configuration of the light source apparatus 10 and the projector 100, it is not necessary to include all constituent elements and the other constituent element may be included.

Meanwhile, the effect described in the present specification is merely an example, is not limited to the description thereof, and may be the other effect. In addition, the present technology may take the following configurations.

(1) A light emitting element including a base material having a rough surface and a phosphor layer which is directly or indirectly formed on the rough surface of the base material and includes a plurality of phosphor particles which are bonded to each other by a binder.

(2) The light emitting element according to (1), in which the rough surface of the base material has a surface roughness Ra value of 300 nm or less.

(3) The light emitting element according to (2), in which the rough surface of the base material has a surface roughness Ra value of 10 nm or more.

(4) The light emitting element according to (3), in which the phosphor layer has a thickness from 30 μm to 120 μm.

(5) The light emitting element according to any one of (1) to (4), in which a difference between a linear expansion coefficient of the base material and a linear expansion coefficient of the binder is 7.6 ppm/K or less.

(6) The light emitting element according to any one of (1) to (5), in which the base material includes at least one kind of Mo (molybdenum), Si (silicon), and W (tungsten) as a constituent element.

(7) The light emitting element according to any one of (1) to (6), in which the binder includes a crosslinked body of an inorganic material.

(8) The light emitting element according to (7), in which the crosslinked body of the inorganic material consists of a silicic acid compound.

(9) The light emitting element according to any one of (1) to (8), further including a reflective layer formed between the rough surface of the base material and the phosphor layer.

(10) A light emitting element including a base material having a surface and a phosphor layer which is directly or indirectly formed on the surface of the base material and includes a plurality of phosphor particles which are bonded to each other by a binder, in which a difference between a linear expansion coefficient of the base material and a linear expansion coefficient of the binder is 7.6 ppm/K or less.

(11) A light source apparatus including a light source part and a light emitting element which emits fluorescent by being excited with light from the light source part, in which the light emitting element includes a base material having a rough surface and a phosphor layer which is formed on the rough surface of the base material and includes a plurality of phosphor particles which are bonded to each other by a binder.

(12) The light source apparatus according to (11), in which the rough surface of the base material has a surface roughness Ra value of 300 nm or less.
(13) The light source apparatus according to (12), in which the rough surface of the base material has a surface roughness Ra value of 10 nm or more.
(14) The light source apparatus according to (13), in which the phosphor layer has a thickness from 30 μm to 120 μm.
(15) The light source apparatus according to any one of (11) to (14), in which a difference between a linear expansion coefficient of the base material and a linear expansion coefficient of the binder is 7.6 ppm/K or less.
(16) The light source apparatus according to any one of (11) to (15), in which the base material includes at least one kind of Mo (molybdenum), Si (silicon), and W (tungsten) as a constituent element.
(17) The light source apparatus according to any one of (11) to (16), in which the binder includes a crosslinked body of an inorganic material.
(18) The light source apparatus according to (17), in which the crosslinked body of the inorganic material consists of a silicic acid compound.
(19) The light source apparatus according to any one of (11) to (18), further including a reflective layer formed between the rough surface of the base material and the phosphor layer.
(20) A projector including a light source apparatus having a light emitting element, a light modulation element modulating light which is ejected from the light source apparatus, and a projection optical system projecting light from the light modulation element, in which the light emitting element includes a base material having a rough surface and a phosphor layer which is formed on the rough surface of the base material and includes a plurality of phosphor particles which are bonded to each other by a binder.

It should be understood by those skilled in the art that various modifications, combinations, sub-combinations and alterations may occur depending on design requirements and other factors insofar as they are within the scope of the appended claims or the equivalents thereof.

What is claimed is:
1. A light emitting element comprising:
   a base material having a rough surface; and
   a phosphor layer which is directly or indirectly formed on the rough surface of the base material and includes a plurality of phosphor particles which are bonded to each other by a binder;
   wherein a difference between a linear expansion coefficient of the base material and a linear expansion coefficient of the binder is 7.6 ppm/K or less.
2. The light emitting element according to claim 1,
   wherein the rough surface of the base material has a surface roughness Ra value of 300 nm or less.
3. The light emitting element according to claim 2,
   wherein the rough surface of the base material has a surface roughness Ra value of 10 nm or more.
4. The light emitting element according to claim 3,
   wherein the phosphor layer has a thickness from 30 μm to 120 μm.
5. The light emitting element according to claim 1,
   wherein the base material includes at least one kind of Mo (molybdenum), Si (silicon), and W (tungsten) as a constituent element.
6. The light emitting element according to claim 1,
   wherein the binder includes a crosslinked body of an inorganic material.
7. The light emitting element according to claim 6,
   wherein the crosslinked body of the inorganic material consists of a silicic acid compound.
8. The light emitting element according to claim 1, further comprising:
   a reflective layer formed between the rough surface of the base material and the phosphor layer.
9. A light emitting element comprising:
   a base material having a surface; and
   a phosphor layer which is directly or indirectly formed on the surface of the base material and includes a plurality of phosphor particles which are bonded to each other by a binder,
   wherein a difference between a linear expansion coefficient of the base material and a linear expansion coefficient of the binder is 7.6 ppm/K or less.
10. A light source apparatus comprising:
    a light source part; and
    a light emitting element which emits fluorescent by being excited with light from the light source part,
    wherein the light emitting element includes
    a base material having a rough surface, and
    a phosphor layer which is formed on the rough surface of the base material and includes a plurality of phosphor particles which are bonded to each other by a binder;
    wherein a difference between a linear expansion coefficient of the base material and a linear expansion coefficient of the binder is 7.6 ppm/K or less.
11. The light source apparatus according to claim 10,
    wherein the rough surface of the base material has a surface roughness Ra value of 300 nm or less.
12. The light source apparatus according to claim 11,
    wherein the rough surface of the base material has a surface roughness Ra value of 10 nm or more.
13. The light source apparatus according to claim 12,
    wherein the phosphor layer has a thickness from 30 μm to 120 μm.
14. The light source apparatus according to claim 10,
    wherein the base material includes at least one kind of Mo (molybdenum), Si (silicon), and W (tungsten) as a constituent element.
15. The light source apparatus according to claim 10,
    wherein the binder includes a crosslinked body of an inorganic material.
16. The light source apparatus according to claim 15,
    wherein the crosslinked body of the inorganic material consists of a silicic acid compound.
17. The light source apparatus according to claim 10, further comprising:
    a reflective layer formed between the rough surface of the base material and the phosphor layer.

* * * * *